(12) United States Patent
Zhang (10) Patent No.: US 11,175,554 B1
(45) Date of Patent: Nov. 16, 2021

(54) LCD PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Yinfeng Zhang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/040,868

(22) PCT Filed: Jul. 14, 2020

(86) PCT No.: PCT/CN2020/101939
§ 371 (c)(1),
(2) Date: Sep. 23, 2020

(30) Foreign Application Priority Data

May 12, 2020 (CN) .......................... 202010399379.3

(51) Int. Cl.
*G02F 1/1343* (2006.01)
*G02F 1/1362* (2006.01)

(52) U.S. Cl.
CPC .. *G02F 1/136286* (2013.01); *G02F 1/136209* (2013.01)

(58) Field of Classification Search
CPC ................................. G02F 1/136286
See application file for complete search history.

(56) References Cited

U.S. PATENT DOCUMENTS

| | | | |
|---|---|---|---|
| 2015/0137130 A1* | 5/2015 | Wang | G02F 1/134336 257/72 |
| 2020/0033680 A1* | 1/2020 | Ye | G02F 1/136209 |
| 2021/0167161 A1* | 6/2021 | Yang | G09G 3/3275 |

* cited by examiner

*Primary Examiner* — Sang V Nguyen
(74) *Attorney, Agent, or Firm* — Osha Bergman Watanabe & Burton LLP (57) ABSTRACT

A liquid crystal display (LCD) panel is provided and includes: a plurality of data lines, a plurality of scan lines, and a plurality of pixel units formed from the data lines and the scan lines. Each of the pixel units is formed from three sub-pixel units. Each of the sub-pixel units has half of a star-shaped structure or half of a square doughnut-shaped structure. A plurality of first light-shielding electrodes and a plurality of second light-shielding electrodes are parallelly arranged on the data lines in an array manner, are respectively connected to a high potential and a low potential, and are alternately disposed.

19 Claims, 5 Drawing Sheets

LCD PANEL

FIELD

The present disclosure relates to the field of display technologies, and more particularly, relates to a liquid crystal display (LCD) panel.

BACKGROUND

Data black matrix less (DBS) technologies, featuring fewer black matrices on data lines, are widely used because they can effectively improve alignment precision between an array substrate and a color filter substrate to prevent light leakage due to an alignment error between the array substrate and the color filter substrate. In addition, the DBS technologies enable voltages to be individually input into indium tin oxides (ITOs), thereby adjusting voltages during an alignment process or a display process. Therefore, the alignment process can be optimized and image quality can be improved. In conventional DBS technologies, ITOs are parallelly connected to each other on an entire surface and are connected to a single external pad, thereby adjusting the entire surface with the single pad.

Domain-reduction pixel structures, which can effectively improve transmittance, have attracted great attention, and a problem of asymmetric viewing angles can be well compensated by appropriately arranging pixels. However, dark lines of the domain-reduction pixel structures are extremely difficult to be converged, which significantly affects efficiency of increasing transmittance. Therefore, viewing angles are difficult to be compensated, resulting in difficulty of the domain-reduction pixel structures to be applied.

In conventional alignment processes, a uniform potential is realized by disposing multiple DBS electrodes on an entire surface, and the DBS electrodes are generally connected to common electrodes on a side of a color filter substrate. However, during practical alignment processes, an operating space is small, so that dark lines of the domain reduction pixel structures are difficult to be converged.

As a result, following problems in conventional LCD panel technologies need to be urgently solved: in LCD panels having DBS shielding electrodes and large domain-reduction pixel structure, dark lines in each of sub-pixel units are extremely difficult to be converged due to asymmetric viewing angles, affecting display quality of the LCD panels.

Regarding the technical problem: the present disclosure provides an LCD panel to solve following problems: in LCD panels having DBS shielding electrodes and large domain-reduction pixel structure, dark lines in each of sub-pixel units are extremely difficult to be converged due to asymmetric viewing angles, affecting display quality of the LCD panels.

SUMMARY

To solve the above problems, technical solutions provided by the present disclosure are described below.

The present disclosure provides an LCD panel, including a plurality of data lines, a plurality of scan lines, and a plurality of pixel units formed from the data lines and the scan lines.

Each of the pixel units is formed from three sub-pixel units, two adjacent sub-pixel units form a star-shaped structure or a square doughnut-shaped structure, and another sub-pixel unit forms half of a star-shaped structure or half of a square doughnut-shaped structure.

A plurality of first light-shielding electrodes and a plurality of second light-shielding electrodes, which are arranged in an array manner, are parallelly disposed on the data lines, the first light-shielding electrodes are connected to a high potential, the second light-shielding electrodes are connected to a low potential, and the first light-shielding electrodes and the second light-shielding electrodes are alternately disposed and are data black matrix less (DBS) common electrode lines.

In one embodiment provided by the present disclosure, the first light-shielding electrodes are formed from a plurality of first repeating units and a plurality of second repeating units, which are arranged in an array manner; and the second light-shielding electrodes are formed from a plurality of third repeating units and a plurality of fourth repeating units, which are arranged in an array manner.

In one embodiment provided by the present disclosure, the first repeating units are disposed on a same straight line, the second repeating units are disposed on a same straight line, the third repeating units are disposed on a same straight line, and the fourth repeating units are disposed on a same straight line.

In one embodiment provided by the present disclosure, each of the first repeating units is formed from a z-shaped pattern and a 7-shaped pattern rotated 180 degrees along a Y-axis, and an end of the z-shaped pattern is electrically connected to an upper end of the 7-shaped pattern. Each of the second repeating units has a shape of the first repeating units rotated 180 degrees along the Y-axis. Each of the third repeating units is formed from a z-shaped pattern and a 7-shaped pattern rotated 180 degrees along the Y-axis, and an end of the z-shaped is electrically connected to an upper end of the 7-shaped pattern. Each of the fourth repeating units has a shape of the third repeating units rotated 180 degrees along the Y-axis.

In one embodiment provided by the present disclosure, an upper edge length of the z-shaped pattern of each of the first repeating units is greater than a width of each of the sub-pixel units, and an upper edge length of the 7-shaped pattern of each of the first repeating units is less than the width of each of the sub-pixel units; and an upper edge length of the z-shaped pattern of each of the third repeating units is greater than the width of each of the sub-pixel units, and an upper edge length of the 7-shaped pattern of each of the third repeating units is less than the width of each of the sub-pixel units.

In one embodiment provided by the present disclosure, each of the first repeating units is formed from a z-shaped pattern, an inverted T-shaped pattern with a left end of a horizontal pattern connected to a vertical part of the inverted T-shaped pattern, and a 7-shaped pattern. The second repeating units and the first repeating units have a same shape. Each of the third repeating units is formed from a z-shaped pattern, a 1-shaped pattern, and a 7-shaped pattern. The fourth repeating units and the third repeating units have a same shape.

In one embodiment provided by the present disclosure, the first repeating units are parallel to the fourth repeating units, and the second repeating units are parallel to the third repeating units.

In one embodiment provided by the present disclosure, each of the first repeating units and one of the second repeating units are disposed on a same straight line, and an end of each of the first repeating units is electrically connected to an end of one of the second repeating units, and a plurality of structures, which are formed from one of the first repeating units and one of the second repeating units, are arranged apart from each other in an array manner by two widths of the sub-pixel units. Each of the third repeating units and one of the fourth repeating units are arranged apart from each other by the width of the sub-pixel units and are electrically connected to each other by a connecting line, and a plurality of structures, which are formed from one of the third repeating units and one of the four repeating units, are arranged apart from each other in an array manner by two widths of the sub-pixel units.

In one embodiment provided by the present disclosure, the second repeating units and the third repeating units have a same shape and a same size, and are formed from a 7-shaped pattern. The first repeating units and the fourth repeating units have a same shape and a same size, and are formed from a 7-shaped pattern rotated 180 degrees along a Y-axis.

In one embodiment provided by the present disclosure, a plurality of first horizontal connecting lines extend from a plurality of connection parts between the first repeating units and the second repeating units to connect to a high potential or a low potential, and a plurality of second horizontal connecting lines extend from the third repeating units and the fourth repeating units to connect to a high potential or a low potential.

In one embodiment provided by the present disclosure, each of the third repeating units and one of the fourth repeating units are connected to each other by a third horizontal connecting line.

In one embodiment provided by the present disclosure, the second repeating units and the third repeating units have a same shape and a same size. The first repeating units and the fourth repeating units are different from the second repeating units and the third repeating units.

In one embodiment provided by the present disclosure, each of the first repeating units is formed from a 7-shaped pattern rotated 180 degrees along the Y-axis and a wavy line. The second repeating units and the third repeating units are formed from a straight line. The fourth repeating units are formed from an inverted T-shaped pattern with a left end of a horizontal pattern connected to a vertical part of the inverted T-shaped pattern.

In one embodiment provided by the present disclosure, each of the first repeating units and one of the second repeating units are directly connected to each other, and each of the third repeating units and one of the fourth repeating units are connected to each other by a third horizontal connecting line.

In one embodiment provided by the present disclosure, each of the third repeating units and one of the fourth repeating units are spaced apart from each other by the width of the sub-pixel units along an X-axis.

In one embodiment provided by the present disclosure, each of the first repeating units is formed from a z-shaped pattern rotated 180 degrees along the Y-axis, an inverted T-shaped pattern with a left end of a horizontal pattern connected to a vertical part of the inverted T-shaped pattern, and a 7-shaped pattern. Each of the second repeating units is formed from a z-shaped pattern, an inverted T-shaped pattern with a left end of a horizontal pattern connected to a vertical part of the inverted T-shaped pattern, and a 7-shaped pattern. Each of the third repeating units is formed from a z-shaped pattern rotated 180 degrees along the Y-axis, a 7-shaped pattern rotated 180 degrees along the Y-axis, and a 7-shaped pattern. Each of the fourth repeating units is formed from a z-shaped pattern, an inverted T-shaped pattern with a left end of a horizontal pattern connected to a vertical part of the inverted T-shaped pattern, and a 7-shaped pattern.

In one embodiment provided by the present disclosure, an upper edge length of the z-shaped pattern rotated 180 degrees along the Y-axis of each of the first repeating units is greater than a width of each of the sub-pixel units. An upper edge of the z-shaped pattern of each of the second repeating units is greater than the width of each of the sub-pixel units, and is equal to the upper edge length of the z-shaped pattern rotated 180 degrees along the Y-axis. An upper edge length of the z-shaped pattern rotated 180 degrees along the Y-axis of each of the third repeating units is less than the width of each of the sub-pixel units; and an upper edge length of the z-shaped pattern of the fourth repeating units is less than the width of each of the sub-pixel units, and is equal to the upper edge length of the z-shaped pattern rotated 180 degrees along the Y-axis of each of the third repeating units.

In one embodiment provided by the present disclosure, a width of each of the first light-shielding electrodes and a width of each of the second light-shielding electrodes are greater than a width of each of the data lines.

The present disclosure provides an LCD panel, including a plurality of data lines, a plurality of scan lines, and a plurality of pixel units formed from the data lines and the scan lines;

wherein each of the pixel units is formed from three sub-pixel units, two adjacent sub-pixel units form a star-shaped structure or a square doughnut-shaped structure, and another sub-pixel unit forms half of a star-shaped structure or half of a square doughnut-shaped structure; and a plurality of first light-shielding electrodes and a plurality of second light-shielding electrodes, which are arranged in an array manner, are parallelly disposed on the data lines, the first light-shielding electrodes are connected to a high potential, the second light-shielding electrodes are connected to a low potential, and the first light-shielding electrodes and the second light-shielding electrodes are alternately disposed.

Compared with conventional technologies, an LCD panel provided by the present disclosure has following beneficial effects:

1. The present disclosure provides an LCD panel, including a plurality of data lines, a plurality of scan lines, and a plurality of pixel units formed from the data lines and the scan lines. Each of the pixel units is formed from three sub-pixel units, two adjacent sub-pixel units form a star-shaped structure or a square doughnut-shaped structure, and another sub-pixel unit is half of a star-shaped structure or half of a square doughnut-shaped structure. A plurality of first light-shielding electrodes and a plurality of second light-shielding electrodes are parallelly disposed on the data lines in an array manner, the first light-shielding electrodes are electrically connected to a high potential, and the second light-shielding electrodes are electrically connected to a low potential. Therefore, liquid crystals can be oriented from a high potential side to a low potential side, and dark lines can be converged from the high potential side to the low potential side. Therefore, the dark lines in each of the pixel units are reduced, and transmittance of the entire LCD panel is increased.

2. In the LCD panel provided by the present disclosure, the first light-shielding electrodes are formed from a plurality of first repeating units and a plurality of second repeating units, which are arranged in an array manner. The second light-shielding electrodes are formed from a plurality of third repeating units and a plurality of fourth repeating units, which are arranged in an array manner. Moreover, the first repeating units, the second repeating units, the third repeating units, and the fourth repeating units include multiple different structures, thereby further reducing the dark lines in each of the pixel units, and improving display quality of the LCD panel.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", "clockwise", "counterclockwise", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

The present disclosure provides an LCD panel, more specifically, as shown in FIG. 1 to FIG. 6.

Conventionally, a domain-reduction pixel structure with a plurality of DBS light-shielding electrodes is applied to LCD panels to improve alignment accuracy of data lines to block light, and simultaneously increase transmittance of the LCD panels. However, because a width of each of sub-pixel units remains unchanged, driving voltages at two side of each of the sub-pixel units remain unchanged during an alignment process of liquid crystals. Therefore, a number of liquid crystals oriented in a same direction is increased, resulting in liquid crystals in a middle portion having relatively low deflection voltage, which makes the liquid crystals in the middle portion difficult to be oriented and leads to dark lines appearing in each of the sub-pixel units. Furthermore, conventionally, voltages applied to an entire surface of DBS electrodes are equal, and are also equal to voltages applied to common electrodes on a side of a color filter substrate, leading to small operating space in practical alignment processes. Therefore, dark lines are difficult to be converged in a same direction. That is, the dark lines occupy too much space and affect display quality of the LCD panels. As a result, the present disclosure provides an LCD panel to solve the above problems.

Figure 1:
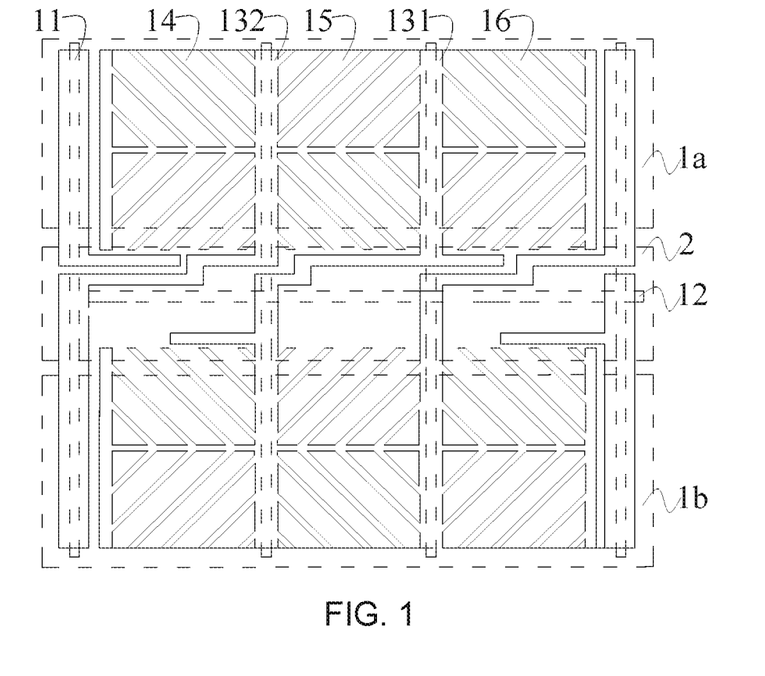
FIG. 1 is a structural schematic view showing a first pixel unit of a display panel provided by an embodiment of the present disclosure.
Figure 2:
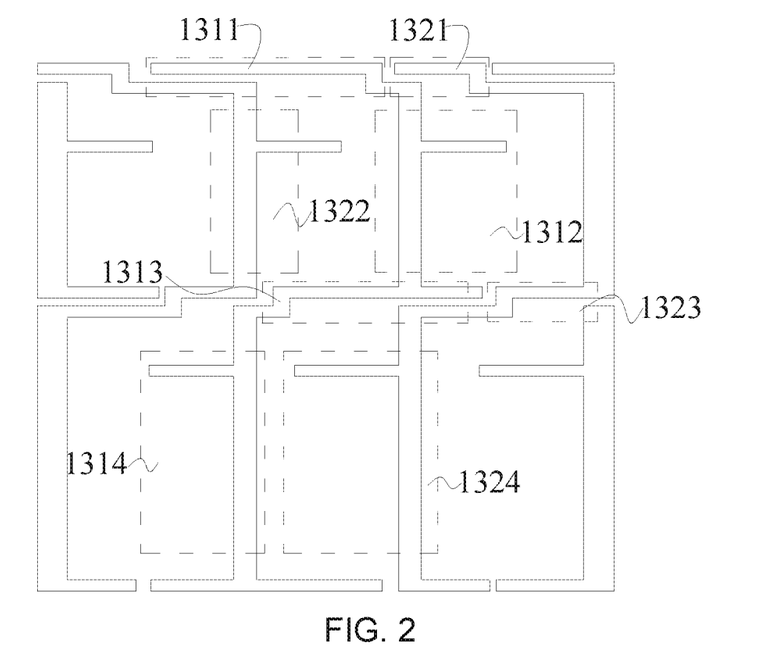
FIG. 2 is a structural schematic view showing a second pixel unit of a display panel provided by an embodiment of the present disclosure.

Please refer to FIG. 1, a structural schematic view showing a first pixel structure of the LCD panel according to an embodiment of the present disclosure is provided. The present disclosure provides an LCD panel, including a plurality of data lines 11, a plurality of scan lines 12, and a plurality of pixel units formed from the data lines 11 and the scan lines 12.

Each of the pixel units is formed from three sub-pixel units, namely a first sub-pixel unit 14, a second sub-pixel unit 15, and a third pixel unit 16. Two adjacent sub-pixel units form a star-shaped structure or a square doughnut-shaped structure, and another sub-pixel unit has half of a star-shaped structure or half of a square doughnut-shaped structure. Specifically, viewed from left to right, each of the pixel units has the star-shaped structure, and a left-half star-shaped structure or a right-half square doughnut-shaped structure. Viewed from right to left, each of the pixel units has the square doughnut-shaped structure, and a left-half star-shaped structure or a right-half square doughnut structure.

A plurality of first light-shielding electrodes 131 and a plurality of second light-shielding electrodes 132 are parallelly disposed on the data lines 11 in an array manner. The first light-shielding electrodes 131 are electrically connected to a high potential, the second light-shielding electrodes 132 are electrically connected to a low potential, and the first light-shielding electrodes 131 and the second light-shielding electrodes 132 are alternately disposed. Therefore, a following problem is solved: dark lines in the sub-pixel units are difficult to be converged because voltages applied to an entire surface of the light-shielding electrodes are equal. As a result, transmittance of the pixel units is increased and display quality of the LCD panel is improved.

Moreover, the LCD panel can further be divided into an opening area 1 (including a first opening area 1a and a second opening area 1b) and a non-opening area 2. A black matrix is disposed on the non-opening area 2 to block light, and light can pass through the opening area 1. The first light-shielding electrodes 131 and the second light-shielding electrodes 132 are parallelly disposed on the data lines 11 in the opening area 1. Widths of the first light-shielding electrodes 131 and widths of the second light-shielding electrodes 132 are greater than widths of the data lines 11, thereby ensuring that the data lines 11 can be completely covered by the first light-shielding electrodes 131 and the second light-shielding electrodes 132.

In some embodiments of the present disclosure, the first light-shielding electrodes 131 are formed from a plurality of first repeating units and a plurality of second repeating units, which are arranged in an array manner. The second light-shielding electrodes 132 are formed from a plurality of third repeating units and a plurality of fourth repeating units, which are arranged in an array manner. Sizes and shapes of the first repeating units, the second repeating units, the third repeating units, and the fourth repeating units may be the same or different, and the first repeating units, the second repeating units, the third repeating units, and the fourth repeating units may be vertically or horizontally arranged in the array manner. Each of the repeating units are formed from a plurality of extending parts with different shapes Please refer to FIG. 2, in some embodiments of the present disclosure, the first repeating units are disposed on a same straight line, the second repeating units are disposed on a same straight line, the third repeating units are disposed on a same straight line, the fourth repeating units are disposed on a same straight line. In this situation, the first repeating units and the second repeating units are vertically arranged, and the third repeating units and the fourth repeating units are vertically arranged. In some embodiments, each of the first repeating units is formed from a z-shaped pattern and a 7-shaped pattern rotated 180 degrees along a Y-axis, an end of the z-shaped pattern is electrically connected to an upper end of the 7-shaped pattern, an upper edge length of the z-shaped pattern of each of the first repeating units is greater than a width of each of the sub-pixel units, and an upper edge length of the 7-shaped pattern of each of the first repeating units is less than the width of each of the sub-pixel units. Each of the second repeating units has the shape of the first repeating units rotated 180 degrees along the Y-axis. Each of the third repeating units is formed from a z-shaped pattern and a 7-shaped pattern rotated 180 degrees along the Y-axis, an end of the z-shaped pattern is electrically connected to an upper end of the 7-shaped pattern, an upper edge length of the z-shaped pattern of the third repeating units is less than the width of each of the sub-pixel units, and an upper edge length of the 7-shaped pattern of each of the third repeating units is less than the width of each of the sub-pixel units. Each of the fourth repeating units has the shape of the third repeating units rotated 180 degrees along the Y-axis.

Figure 3:
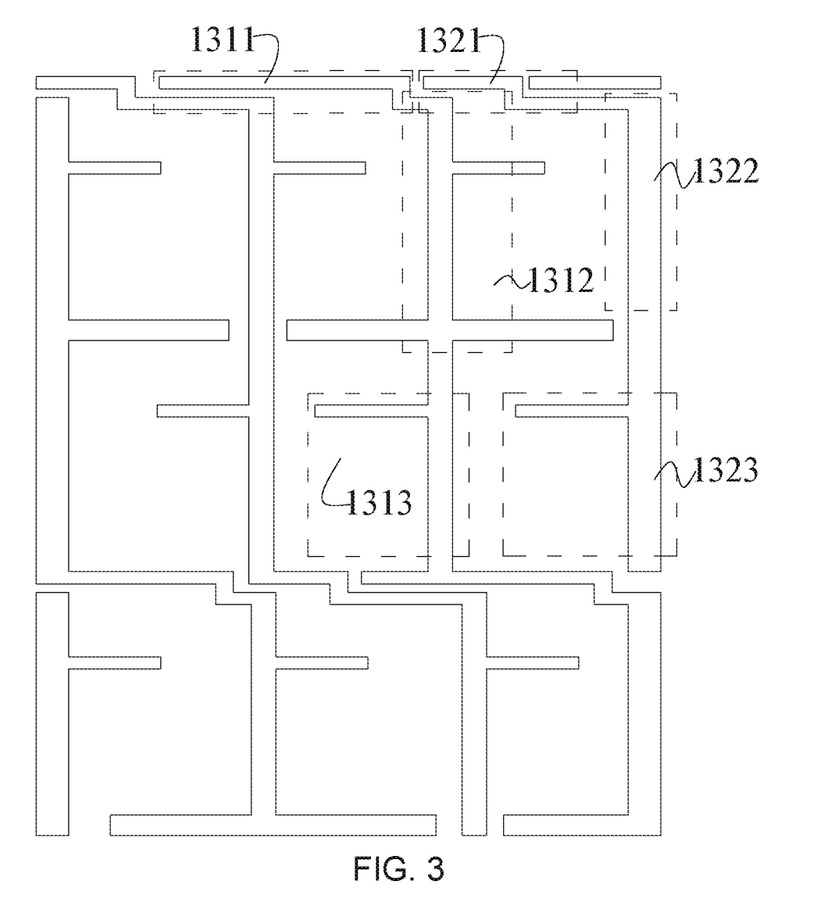
FIG. 3 is a structural schematic view showing a third pixel unit of a display panel provided by an embodiment of the present disclosure.

Please refer to FIG. 3, in some embodiments of the present disclosure, the first repeating units are formed from a z-shaped pattern, an inverted T-shaped pattern with a left end of a horizontal pattern connected to a vertical part of the inverted T-shaped pattern, and a 7-shaped pattern. An upper edge length of the z-shaped pattern of the first repeating units is greater than the width of each of the pixel units, and an upper edge length of the 7-shaped is less than the width of each of the sub-pixel units. The second repeating units have the same shape as the first repeating units. Each of the third repeating units is formed from a z-shaped pattern, a 1-shaped pattern, and a 7-shaped pattern, an upper edge length of the z-shaped pattern of the third repeating units is less than the width of each of the sub-pixel units, and an upper edge length of the 7-shaped pattern of each of the third repeating units is less than the width of each of the sub-pixel units. The fourth repeating units have the same shape as the third repeating units.

Figure 4:
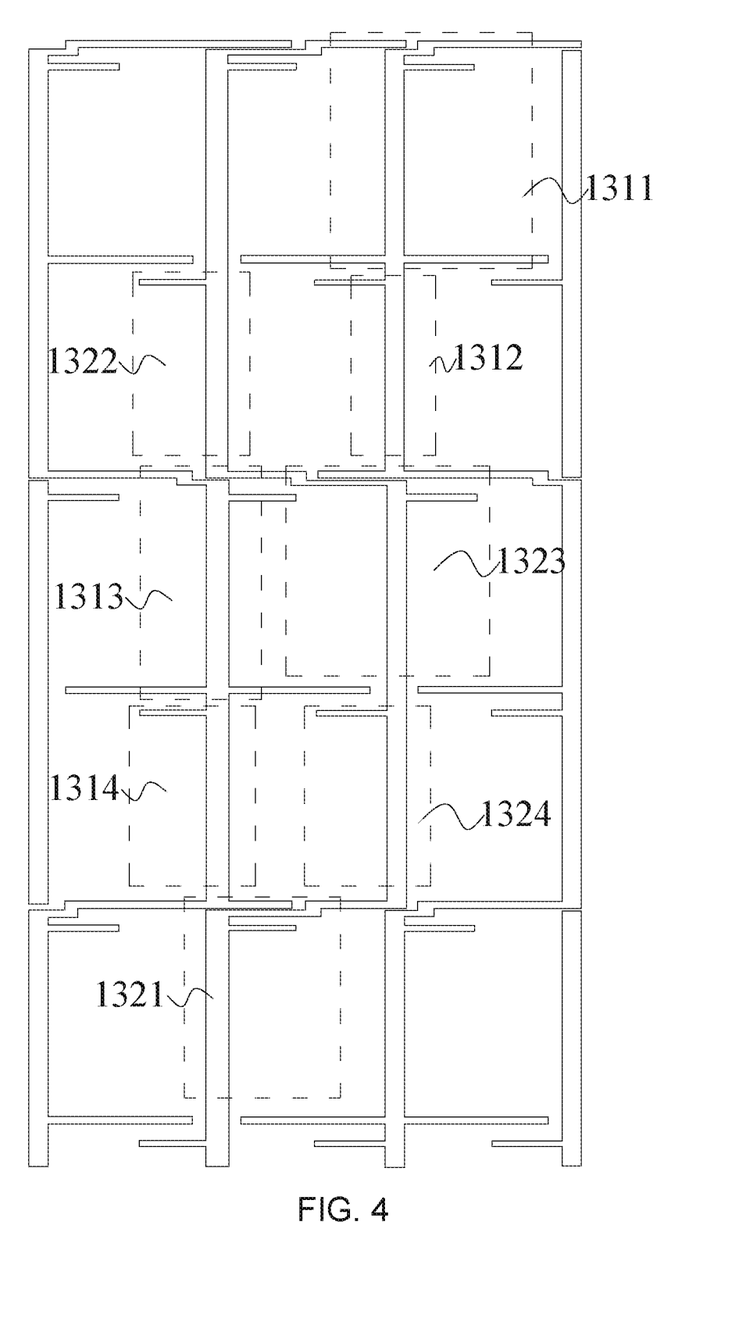
FIG. 4 is a structural schematic view showing a fourth pixel unit of a display panel provided by an embodiment of the present disclosure.

Please refer to FIG. 4, in some embodiment of the present disclosure, each of the first repeating units is formed from a z-shaped pattern rotated 180 degrees along the Y-axis, an inverted T-shaped pattern with a left end of a horizontal pattern connected to a vertical part of the inverted T-shaped pattern (1311), and a 7-shaped pattern 1312, and an upper end of the z-shaped pattern rotated 180 degrees along the Y-axis is greater than the width of each of the sub-pixel units. Each of the second repeating units is formed from a z-shaped pattern, an inverted T-shaped pattern with a left end of a horizontal pattern connected to a vertical part of the inverted T-shaped pattern (1313), and a 7-shaped pattern 1314. An upper edge length of the z-shaped pattern of each of the second repeating units is greater than the width of each of the sub-pixel units and is equal to the upper edge length of the z-shaped pattern rotated 180 degrees along the Y-axis of each of the first repeating units. Each of the third repeating units is formed from a z-shaped pattern rotated 180 degrees along the Y-axis, a 7-shaped pattern rotated 180 degrees along the Y-axis (1321), and a 7-shaped pattern 1322. An upper edge length of the z-shaped pattern rotated 180 degrees along the Y-axis of each of the third repeating units is less than the width of each of the sub-pixel units. Each of the fourth repeating units is formed from a z-shaped pattern, an inverted T-shaped pattern with a left end of a horizontal pattern connected to a vertical part of the inverted T-shaped pattern (1323), and a 7-shaped pattern 1324. An upper edge length of the z-shaped pattern of each of the fourth repeating units is less than the width of each of the sub-pixel units and is equal to the upper edge length of the z-shaped pattern rotated 180 degrees along the Y-axis of the third repeating units.

Figure 5:
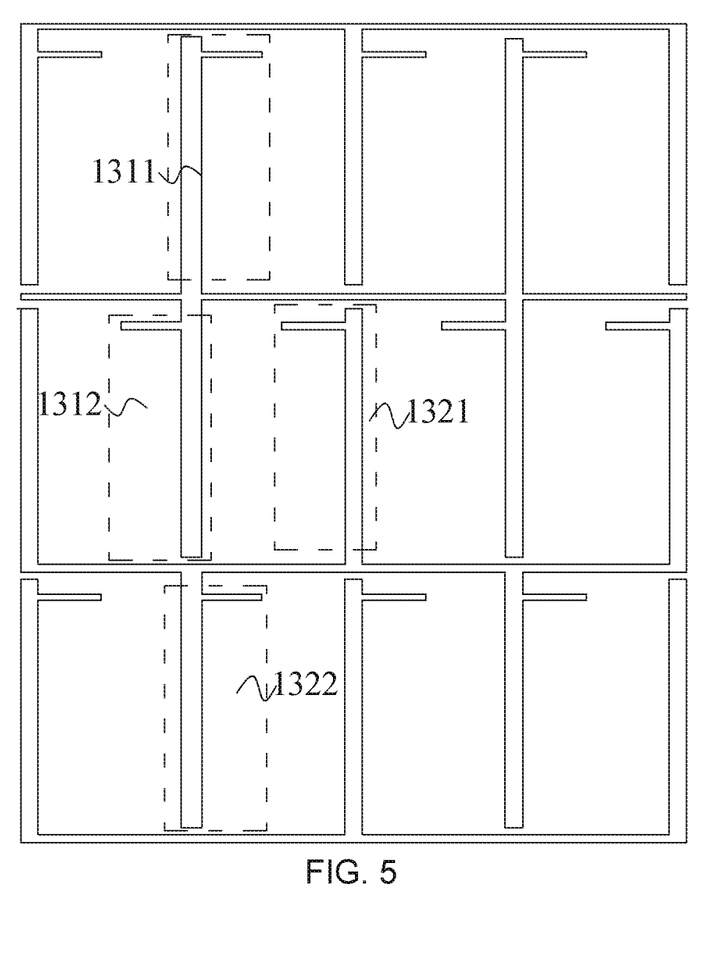
FIG. 5 is a structural schematic view showing a fifth pixel unit of a display panel provided by an embodiment of the present disclosure.
Figure 6:
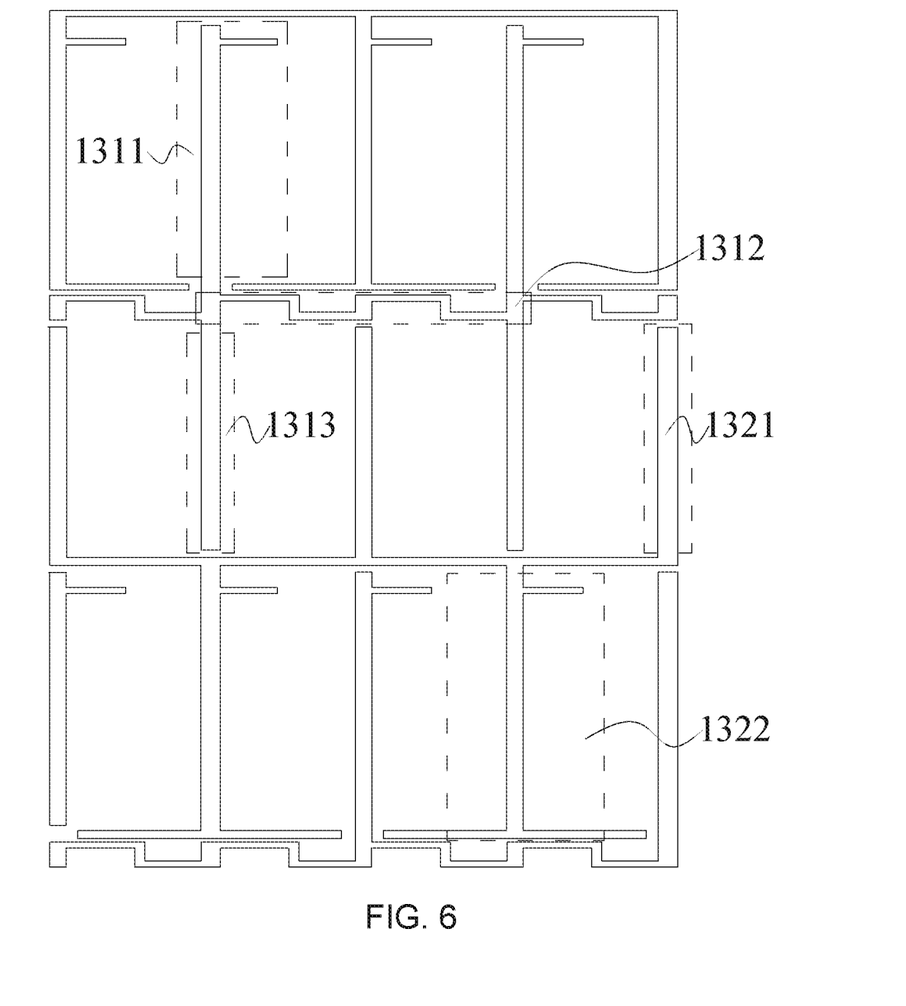
FIG. 6 is a structural schematic view showing a sixth pixel unit of a display panel provided by an embodiment of the present disclosure.

Please refer to FIG. 5 and FIG. 6, in one embodiment provided by the present disclosure, the first repeating units are parallel to the fourth repeating units, and the second repeating units are parallel to the third repeating units.

Please refer to FIG. 5, in one embodiment of the present disclosure, the first repeating units 1311 and the second repeating units 1312 are disposed on a same straight line, an end of each of the first repeating units 1311 is electrically connected to an end of one of the second repeating units 1312, and a plurality of structures, which are formed from one of the first repeating units 1311 and one of the second repeating units 1312, are arranged apart from each other in an array manner by two widths of the sub-pixel units. Each of the third repeating units 1321 and one of the fourth repeating units 1322 are spaced apart from each other by the width of the sub-pixel units, and are electrically connected to each other by a connecting line. A plurality of structures, which are formed from one of the third repeating units 1321 and one of the fourth repeating units 1322, are arranged apart from each other in an array manner by two widths of the sub-pixel units.

Furthermore, shapes and sizes of the second repeating units 1312 and the third repeating units 1321 are the same, and the second repeating units 1312 and the third repeating units 1321 are formed from a 7-shaped pattern. Shapes and sizes of the first repeating units 1311 and the fourth repeating units 1322 are the same, and the first repeating units 1311 and the fourth repeating units 1322 are formed from a 7-shaped pattern rotated 180 degrees along the Y-axis. A lower end of each of the first repeating units 1311 and an upper end of one of the second repeating units 1312 are electrically connected each other, and the structures, which are formed from one of the first repeating units 1311 and one of the second repeating units 1312, are spaced apart from each other by two widths of the sub-pixel units. Furthermore, a plurality of first horizontal connecting lines extend from a plurality of connecting parts between first repeating units 1311 and the second repeating units 1312 to connect to a high potential or a low potential. Each of the third repeating units is connected to one of the fourth repeating units by a horizontal connecting line. Each of the third repeating units and one of the fourth repeating units are arranged apart from each other in an array manner by the width of the pixel units, and are connected to a high potential or a low potential by a second horizontal connecting line, respectively.

Please refer to FIG. 6, in one embodiment provided by the present disclosure, shapes and sizes of the second repeating units and the third repeating units are the same, and the first repeating units and the fourth repeating units are different from the second repeating units and the third repeating units.

Furthermore, each of the first repeating units is formed from a 7-shaped pattern 1311 rotated 180 degrees along the Y-axis and a wavy line 1312. Each of the second repeating units 1313 and each of the third repeating units 1321 are formed from a straight line. Each of the fourth repeating units is formed from an inverted T-shaped pattern with a left end of a horizontal pattern connected to a vertical part of the inverted T-shaped pattern (1322). The first repeating units and the second repeating units are directly connected to each other, and the third repeating units and the fourth repeating units are connected to each other by a third horizontal connecting line.

Furthermore, the first light-shielding electrodes and the second light-shielding electrodes are DBS common electrode lines, which are configured to prevent light from emitting on the data lines in the opening area.

Furthermore, in all of the repeating units mentioned in the above embodiments, all structures horizontally extending along an X-axis are disposed in the non-opening area of the pixel units. Because a black matrix is disposed on the entire non-opening area, shapes of the light-shielding electrodes in the non-opening area are not limited. Moreover, in the non-opening area, an extending length of the light-shielding electrodes connected to the high potential is greater than an extending length of the light-shielding electrodes connected to the low potential, thereby forming better potential difference. Therefore, liquid crystals are easy to be oriented in the same direction, dark lines are converged at a low potential side. As a result, transmittance of the LCD panel is increased, and display quality of the LCD panel is improved.

In summary, the LCD panel provided by the present disclosure has following beneficial effects: the LCD panel includes a plurality of data lines, a plurality of scan lines, and a plurality of pixel units formed from the data lines and the scan lines. Each of the pixel units is formed from three sub-pixel units, two adjacent sub-pixel units form a star-shaped structure or a square doughnut-shaped structure, and another sub-pixel unit is half of a star-shaped structure or half of a square doughnut-shaped structure. A plurality of first light-shielding electrodes and a plurality of second light-shielding electrodes are parallelly disposed on the data lines in an array manner, the first light-shielding electrodes are electrically connected to a high potential, and the second light-shielding electrodes are electrically connected to a low potential. Therefore, liquid crystals can be oriented from a high potential side to a low potential side, and dark lines can be converged from the high potential side to the low potential side. Therefore, the dark lines in each of the pixel units are reduced, and transmittance of the entire LCD panel is increased. In the LCD panel provided by the present disclosure, the first light-shielding electrodes are formed from a plurality of first repeating units and a plurality of second repeating units, which are arranged in an array manner. The second light-shielding electrodes are formed from a plurality of third repeating units and a plurality of fourth repeating units, which are arranged in an array manner. Moreover, the first repeating units, the second repeating units, the third repeating units, and the fourth repeating units include multiple different structures, thereby further reducing the dark lines in each of the pixel units, and improving display quality of the LCD panel.

The LCD panel has been described in detail with embodiments provided by the present disclosure which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A liquid crystal display (LCD) panel, comprising a plurality of data lines, a plurality of scan lines, and a plurality of pixel units formed from the data lines and the scan lines;
    wherein each of the pixel units is formed from three sub-pixel units, two adjacent sub-pixel units form a star-shaped structure or a square doughnut-shaped structure, and another sub-pixel unit forms half of a star-shaped structure or half of a square doughnut-shaped structure; and
    a plurality of first light-shielding electrodes and a plurality of second light-shielding electrodes, which are arranged in an array manner, are parallelly disposed on the data lines, the first light-shielding electrodes are connected to a high potential, the second light-shielding electrodes are connected to a low potential, and the first light-shielding electrodes and the second light-shielding electrodes are alternately disposed and are data black matrix less (DBS) common electrode lines.

2. The LCD panel of claim 1, wherein the first light-shielding electrodes are formed from a plurality of first repeating units and a plurality of second repeating units, which are arranged in an array manner; and
    the second light-shielding electrodes are formed from a plurality of third repeating units and a plurality of fourth repeating units, which are arranged in an array manner.

3. The LCD panel of claim 2, wherein the first repeating units are disposed on a same straight line, the second repeating units are disposed on a same straight line, the third repeating units are disposed on a same straight line, and the fourth repeating units are disposed on a same straight line.

4. The LCD panel of claim 3, wherein each of the first repeating units is formed from a z-shaped pattern and a 7-shaped pattern rotated 180 degrees along a Y-axis, and an end of the z-shaped pattern is electrically connected to an upper end of the 7-shaped pattern;
    each of the second repeating units has a shape of the first repeating units rotated 180 degrees along the Y-axis;
    each of the third repeating units is formed from a z-shaped pattern and a 7-shaped pattern rotated 180 degrees along the Y-axis, and an end of the z-shaped pattern is electrically connected to an upper end of the 7-shaped pattern; and each of the fourth repeating units has a shape of the third repeating units rotated 180 degrees along the Y-axis.

5. The LCD panel of claim 4, wherein an upper edge length of the z-shaped pattern of each of the first repeating units is greater than a width of each of the sub-pixel units, and an upper edge length of the 7-shaped pattern of each of the first repeating units is less than the width of each of the sub-pixel units; and an upper edge length of the z-shaped pattern of each of the third repeating units is greater than the width of each of the sub-pixel units, and an upper edge length of the 7-shaped pattern of each of the third repeating units is less than the width of each of the sub-pixel units.

6. The LCD panel of claim 3, wherein each of the first repeating units is formed from a z-shaped pattern, an inverted T-shaped pattern with a left end of a horizontal pattern connected to a vertical part of the inverted T-shaped pattern, and a 7-shaped pattern;

the second repeating units and the first repeating units have a same shape;

each of the third repeating units is formed from a z-shaped pattern, a 1-shaped pattern, and a 7-shaped pattern; and the fourth repeating units and the third repeating units have a same shape.

7. The LCD panel of claim 2, wherein the first repeating units are parallel to the fourth repeating units, and the second repeating units are parallel to the third repeating units.

8. The LCD panel of claim 7, wherein each of the first repeating units and one of the second repeating units are disposed on a same straight line, and an end of each of the first repeating units is electrically connected to an end of one of the second repeating units, and a plurality of structures, which are formed from one of the first repeating units and one of the second repeating units, are arranged apart from each other in an array manner by two widths of the sub-pixel units; and each of the third repeating units and one of the fourth repeating units are arranged apart from each other by the width of the sub-pixel units and are electrically connected to each other by a connecting line, and a plurality of structures, which are formed from one of the third repeating units and one of the four repeating units, are arranged apart from each other in an array manner by two widths of the sub-pixel units.

9. The LCD panel of claim 8, wherein the second repeating units and the third repeating units have a same shape and a same size, and are formed from a 7-shaped pattern; and the first repeating units and the fourth repeating units have a same shape and a same size, and are formed from a 7-shaped pattern rotated 180 degrees along a Y-axis.

10. The LCD panel of claim 9, wherein a plurality of first horizontal connecting lines extend from a plurality of connection parts between the first repeating units and the second repeating units to connect to a high potential or a low potential; and a plurality of a second horizontal connecting lines extend from the third repeating units and the fourth repeating units to connect to a high potential or a low potential.

11. The LCD panel of claim 10, wherein each of the third repeating units and one of the fourth repeating units are connected to each other by a third horizontal connecting line.

12. The LCD panel of claim 8, wherein the second repeating units and the third repeating units have a same shape and a same size; and the first repeating units and the fourth repeating units are different from the second repeating units and the third repeating units.

13. The LCD panel of claim 12, wherein each of the first repeating units is formed from a 7-shaped pattern rotated 180 degrees along the Y-axis and a wavy line;

the second repeating units and the third repeating units are formed from a straight line; and the fourth repeating units are formed from an inverted T-shaped pattern with a left end of a horizontal pattern connected to a vertical part of the inverted T-shaped pattern.

14. The LCD panel of claim 13, wherein each of the first repeating units and one of the second repeating units are directly connected to each other, and each of the third repeating units and one of the fourth repeating units are connected to each other by a third horizontal connecting line.

15. The LCD panel of claim 14, wherein each of the third repeating units and one of the fourth repeating units are spaced apart from each other by the width of the sub-pixel units along an X-axis.

16. The LCD panel of claim 7, wherein each of the first repeating units is formed from a z-shaped pattern rotated 180 degrees along a Y-axis, an inverted T-shaped pattern with a left end of a horizontal pattern connected to a vertical part of the inverted T-shaped pattern, and a 7-shaped pattern;

each of the second repeating units is formed from a z-shaped pattern, an inverted T-shaped pattern with a left end of a horizontal pattern connected to a vertical part of the inverted T-shaped pattern, and a 7-shaped pattern;

each of the third repeating units is formed from a z-shaped pattern rotated-180 degrees along the Y-axis, a 7-shaped pattern rotated 180 degrees along the Y-axis, and a 7-shaped pattern; and each of the fourth repeating units is formed from a z-shaped pattern, an inverted T-shaped pattern with a left end of a horizontal pattern connected to a vertical part of the inverted T-shaped pattern, and a 7-shaped pattern.

17. The LCD panel of claim 16, wherein an upper edge length of the z-shaped pattern rotated 180 degrees along the Y-axis of each of the first repeating units is greater than a width of each of the sub-pixel units;

an upper edge of the z-shaped pattern of each of the second repeating units is greater than the width of each of the sub-pixel units, and is equal to the upper edge length of the z-shaped pattern rotated 180 degrees along the Y-axis;

an upper edge length of the z-shaped pattern rotated 180 degrees along the Y-axis of each of the third repeating units is less than the width of each of the sub-pixel units; and an upper edge length of the z-shaped pattern of the fourth repeating units is less than the width of each of the sub-pixel units, and is equal to the upper edge length of the z-shaped pattern rotated 180 degrees along the Y-axis of each of the third repeating units.

18. The LCD panel of claim 1, wherein a width of each of the first light-shielding electrodes and a width of each of the second light-shielding electrodes are greater than a width of each of the data lines.

19. A liquid crystal display (LCD) panel, comprising a plurality of data lines, a plurality of scan lines, and a plurality of pixel units formed from the data lines and the scan lines;
  wherein each of the pixel units is formed from three sub-pixel units, two adjacent sub-pixel units form a star-shaped structure or a square doughnut-shaped structure, and another sub-pixel unit forms half of a star-shaped structure or half of a square doughnut-shaped structure; and
  a plurality of first light-shielding electrodes and a plurality of second light-shielding electrodes, which are arranged in an array manner, are parallelly disposed on the data lines, the first light-shielding electrodes are connected to a high potential, the second light-shielding electrodes are connected to a low potential, and the first light-shielding electrodes and the second light-shielding electrodes are alternately disposed.

* * * * *